United States Patent [19]
Carlton et al.

[11] Patent Number: 5,639,004
[45] Date of Patent: Jun. 17, 1997

[54] CONVERTIBLE CARRYING CASE AND WORK PLATFORM FOR SMALL ELECTRONIC DEVICES

[75] Inventors: Douglas David Carlton, Durham; Sherry McLean McQuage, Wagram, both of N.C.

[73] Assignee: Truckin' Movers Corporation, Durham, N.C.

[21] Appl. No.: 624,000

[22] Filed: Apr. 4, 1996

Related U.S. Application Data

[63] Continuation of Ser. No. 271,150, Jul. 6, 1994, abandoned.

[51] Int. Cl.$^6$ .................................. A45F 4/00; A45F 3/04
[52] U.S. Cl. ...................... 224/579; 224/270; 224/627; 224/580; 224/642; 224/644; 224/647; 224/630; 224/657; 224/901.2; 224/930; 206/320; 206/579; 190/125
[58] Field of Search ..................... 224/270, 259, 224/579, 580, 642, 644, 646, 647, 630, 657, 627, 930, 901.2; 206/320, 579; 190/124, 125, 115; 108/43; 383/4

[56] References Cited

U.S. PATENT DOCUMENTS

| | | | |
|---|---|---|---|
| D. 234,410 | 2/1975 | Rosenblum | D87/5 G |
| D. 241,783 | 10/1976 | Sykes | D87/5 E |
| D. 272,581 | 2/1984 | Petroff | D3/71 |
| D. 280,465 | 9/1985 | Baum | D3/33 |
| D. 293,506 | 1/1988 | Kappel et al. | D3/33 |
| D. 297,386 | 8/1988 | Martin | D3/71 |
| D. 302,211 | 7/1989 | Sears | D3/71 |
| D. 303,177 | 9/1989 | Lehman | D3/76 |
| D. 322,788 | 12/1991 | Jayez | D14/250 |
| D. 323,743 | 2/1992 | DiSessa et al. | D3/74 |
| D. 338,104 | 8/1993 | Lee | D3/77 |
| D. 341,487 | 11/1993 | Gloss, II | D3/74 |
| 1,542,163 | 6/1925 | Morde | 108/43 |
| 1,613,440 | 1/1927 | Carek | 108/43 |
| 3,541,976 | 11/1970 | Rozas | 108/43 |
| 3,739,961 | 6/1973 | Soukeras . | |
| 4,450,993 | 5/1984 | Ephraim | 224/265 |
| 4,537,340 | 8/1985 | Waltzer | 224/202 |
| 4,558,808 | 12/1985 | Fullmer | 224/270 |
| 4,609,084 | 9/1986 | Thomas | 224/259 |
| 4,715,293 | 12/1987 | Cobbs | 108/43 |
| 4,733,806 | 3/1988 | Sloop | 224/202 |
| 4,915,278 | 4/1990 | Smith | 224/205 |
| 4,921,103 | 5/1990 | Cohen | 206/523 |
| 4,929,948 | 5/1990 | Holmberg | 340/407 |
| 4,941,604 | 7/1990 | Nagareda | 224/160 |
| 5,010,988 | 4/1991 | Brown | 190/104 |
| 5,016,797 | 5/1991 | Rowledge | 224/257 |
| 5,186,375 | 2/1993 | Plonk | 224/202 |
| 5,217,119 | 6/1993 | Hollingsworth | 206/583 |
| 5,260,884 | 11/1993 | Stern | 364/708.1 |
| 5,263,423 | 11/1993 | Anderson | 108/43 |
| 5,325,970 | 7/1994 | Dillon et al. | 206/576 |
| 5,337,985 | 8/1994 | Hale | 248/174 |
| 5,400,903 | 3/1995 | Cooley | 206/320 |

FOREIGN PATENT DOCUMENTS

1238303  7/1971  United Kingdom .................. 224/153

OTHER PUBLICATIONS

MacUser, Feb. 1994, pp. 6 and 250.
APS Technologies, vol. 3, Issue 3, Summer 1994, title, table of contents, pp. 49 and 50.
APS Technologies, Winter 1994, pp. 46–47 and 50–51.

*Primary Examiner*—Linda J. Sholl
*Attorney, Agent, or Firm*—Olive & Olive, P.A.

[57] ABSTRACT

A convertible carrying case and work platform for small electronic devices, particularly notebook computers, which is adapted to be used as a carrying case for the electronic device as well as a work platform. In a preferred embodiment, the carrying case has a case structure which holds the electronic device and a flexible top cover portion capable of forming a rolled portion that elevates the case structure when the case is supported in the wearer's lap and used when the wearer is sitting or in a reclined position, or, when the wearer uses the case while in standing position, spaces the case at a distance away from the wearer's body and provides a cushion between the case and the abdominal area of the wearer. A strap arrangement for the case permits a wearer to support the case over his shoulder to transport the device, or to position the case in a generally horizontal position in front of and against the abdominal area of the wearer. The case is particularly suited to persons who choose to compute without the aid of a desk or a table, for example, while commuting or traveling, or for those who must compute on their feet, for example, by persons who inventory goods, like moving personnel who inventory the goods located on a premises in preparation for packing and shipping the goods, by persons conducting retail invoicing and pricing, and by census takers, building inspectors and insurance adjustors.

36 Claims, 5 Drawing Sheets

CONVERTIBLE CARRYING CASE AND WORK PLATFORM FOR SMALL ELECTRONIC DEVICES

This is a continuation of application Ser. No. 08/271,150, filed Jul. 6, 1994, now abandoned.

BACKGROUND OF THE INVENTION

1. Field of the Invention

This invention relates to carrying cases and work platforms for small electronic devices, such as notebook computers, tablet computers, personal digital assistants and printers.

2. Description of the Related Art

There exists a need in the art for a carrying case for small electronic devices, particularly notebook computers and the like, that can convert into a work platform for at least one such electronic device such that the work platform permits the wearer to comfortably operate the device while the wearer is sitting or in a semi-reclined position or when the wearer is standing and mobile. In a preferred embodiment, the carrying case should be supportable on a wearer's lap and elevated and tilted slightly toward the wearer to provide an ergonomically comfortable work surface for the electronic device. In another preferred embodiment, the electronic device should be supportable in its carrying case in a generally horizontal position in front of a wearer. In this manner the wearer would have the ability to use both hands to operate the electronic device without having to use his or her arms or hands to support the device.

A number of carrying cases exist for computers. The patent of Brown, U.S. Pat. No. 5,010,988, entitled "Expandable Shock Protected Carrying Case" describes a carrying case specifically adapted for use in carrying notebook computers, among other things, and having a main storage compartment and a secondary storage compartment with an expansion zone to permit the secondary storage compartment to expand.

The patent of Stern, U.S. Pat. No. 5,260,884, entitled "Brief Case Having Integral Computer" describes a brief case which contains a computer as an integral part of the case. The patent of Holmberg, U.S. Pat. No. 4,929,948, entitled "Portable Data System" describes a rigid case in which a unit is supported by a carrier plate.

Devices also exist which provide platforms that can be supported by users when the users are in a standing position. The patent of Sloop, U.S. Pat. No. 4,733,806, entitled "Case" describes a shoulder case for camera equipment which is adapted to permit the case to be accessed by a user while being supported in a horizontal position by the user. The patent of Plonk, U.S. Pat. No. 5,186,475, entitled "Body Supported Holder for Electronic Devices" describes a body supported combination holder and writing surface for use with hand held computers in the field of utility meter reading and provides for the retention of such a computer within a channel of the holder. The patent of Rozas, U.S. Pat. No. 3,541,976, entitled "Portable Body-Mounted Desk" describes a portable desk or table that has a support firmly attached to the body of the user and a work surface pivotally and slidably attached to the support.

The patent of Cobbs, U.S. Pat. No. 4,715,293, entitled "Body-Supported Hand-Operated Instrument Desk" describes a desk that includes a pair of vertical frame members, a rectangular member rotatably attached to the frame, and a pair of shoulder straps. The patent of Ephraim, U.S. Pat. No. 4,450,993, entitled "Keyboard Carrier" describes a brace and plate assembly attachable over the shoulders and along the belt line of a wearer.

Devices in the art do not provide a carrying case for small electronic devices that also converts into a work platform for the electronic device, particularly a work platform which permits the wearer to operate the device while the wearer is sitting, reclined or standing and mobile. Additionally, most devices do not provide the ease, convenience and comfort of use as the convertible carrying case of the instant invention.

It is therefore an advantage of this invention to provide a carrying case for small electronic devices, particularly a notebook computer that is adapted for use both as a carrying case for the computer and as a work platform for the computer when the wearer is sitting.

It is a further advantage of this invention to provide a carrying case for small electronic devices, particularly a notebook computer, that is adapted both for use as a carrying case for the computer and as a work platform for the computer that can be supported in front of the wearer for use while the wearer is standing and particularly when the wearer is also mobile.

It is a further advantage of this invention to provide a convertible carrying case and work platform that is easy, convenient, and comfortable for a wearer to use.

Other advantages will be more fully apparent from the following disclosure and appended claims.

SUMMARY OF THE INVENTION

The present invention is directed to a convertible carrying case and work platform for notebook computers and other small electronic devices, such as tablet computers, personal digital assistants and printers, that provides the advantages and satisfies the needs mentioned above. The carrying case having features of the present invention is adapted for use both as a carrying case and as a work platform. The carrying case of the invention basically comprises a case structure, and a transport device and an elevating device and a spacing device that convert the case into a work platform. The case structure has a rectangular bottom panel portion, four walls, and a top cover portion. The top cover portion is located opposite of the bottom panel portion and is releasably joinable to at least three of the walls to form a closable case.

In a preferred embodiment, the top cover portion provides the elevating device and the spacing device. The top cover portion is a flexible portion capable of forming a rolled portion that elevates the case when the case is supported in the wearer's lap and used when the wearer is in sitting, thereby forming the elevating device. The top cover portion is also capable of forming a rolled portion that spaces the case at a distance away from the wearer's body and provides a cushion between the case and the abdominal area of the wearer when the wearer uses the case while in standing or in a semi-reclined position.

The transport device is a strap arrangement that enables a wearer of the convertible carrying case to support the case structure over the wearer's shoulder for transporting an electronic device contained within the case structure. The transport device may include a handle that provides hand carrying means for the case. In a preferred embodiment, the strap arrangement is attached to the case structure in such a manner which also enables the wearer to position the case structure in a generally horizontal position in front of the wearer when the wearer is standing. In a preferred arrangement, the strap arrangement comprises two straps. The first strap and second strap lay generally parallel on top of each other to form a shoulder strap when the case is supported on a wearer's shoulder as a carrying case.

The straps also are capable of forming a harness for the case. In forming the harness, the first strap passes over one shoulder of the wearer and the second strap passes over the other shoulder of the wearer. The straps cross at a connection point which is positioned against the wearer's back in approximately the middle of the wearer's back. This harness enables the case to be positioned in front of the wearer in a generally horizontal position against the wearer's abdominal area to provide a standing work platform. This arrangement keeps the wearer's hands free to operate the computer when the wearer is in a standing position and mobile. A wearer who desires to use the carrying case only in standing position would not have to have both an elevating device and a spacing device as part of the case structure, but could rather have no such device or only a spacing device to provide spacing and cushioning. When the wearer is sitting, the carrying case assumes a sitting work platform position, and the straps are either detached or positioned so as not to obstruct use of the computer.

Other aspects and features of the invention will be more fully apparent from the following disclosure and appended claims.

DETAILED DESCRIPTION OF THE INVENTION AND PREFERRED EMBODIMENTS THEREOF

Figure 1:
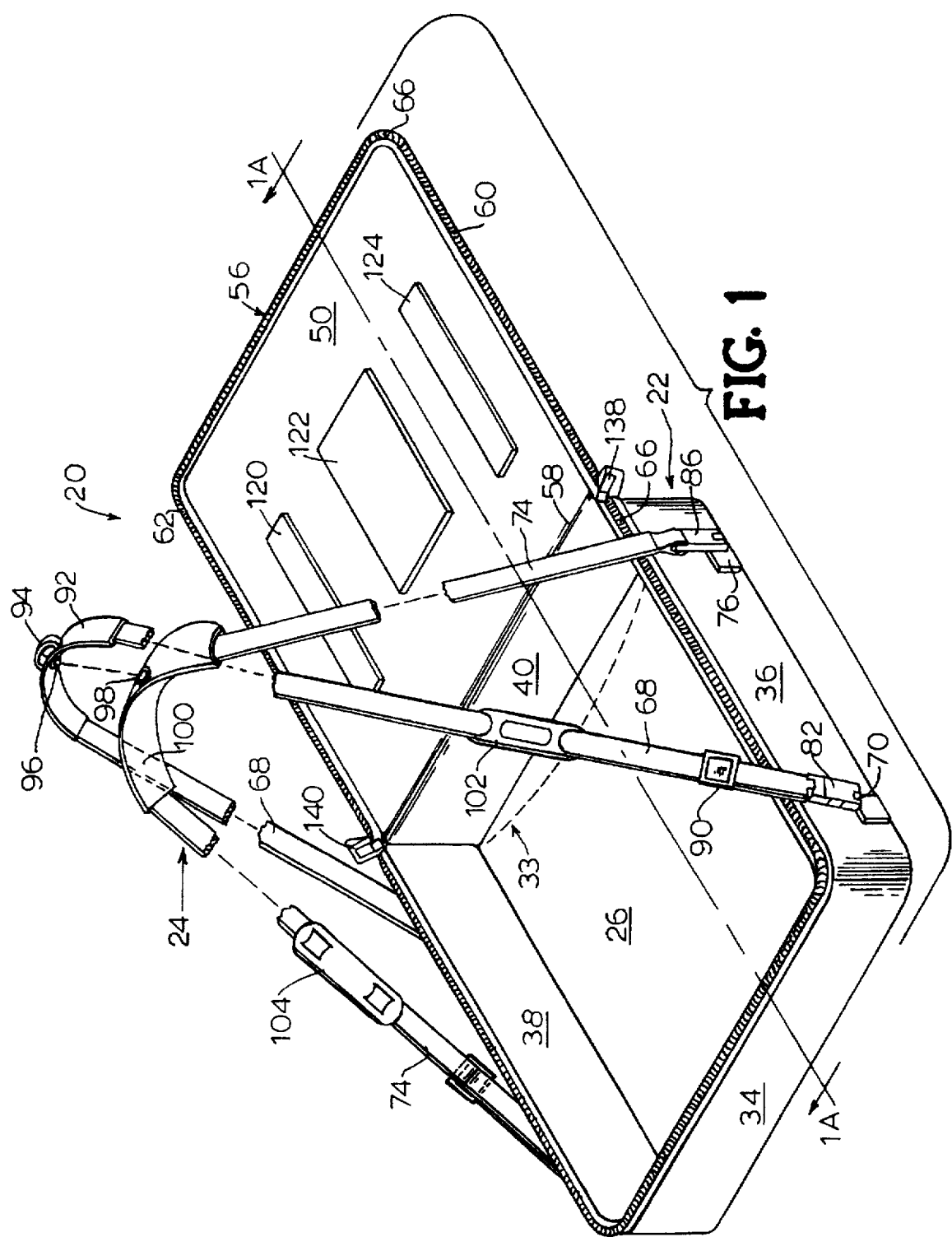
FIG. 1 is a front perspective view of an embodiment of the invention showing the carrying case in an open position and the straps separated from one another and suspended above the case structure for ease of reference.

The present invention relates to a convertible carrying case having a case structure, an elevating device, a spacing device, and a transport device. The case structure comprises a rectangular box having an interior area, a first side wall, a second side wall, a rear wall, a front wall, and a bottom panel portion surrounding said interior area, each of the walls having an upper edge, and forming with the bottom panel portion an exterior of the case structure; and a top cover portion releasably joinable to the upper edges of at least three of the walls. The elevating device is capable of elevating the carrying case in a wearer's lap when the carrying case is positioned in the wearer's lap. The spacing device is capable of spacing the carrying case at a distance away from the wearer's body and of cushioning the wearer when the carrying case is positioned in front of the wearer in a generally horizontal position when the wearer is standing, or when the carrying case is positioned in front of the wearer when the wearer is in a semi-reclined position. In a preferred embodiment the top cover portion is capable of forming both the elevating device and the spacing device by forming a rolled portion which is releasably attachable to the exterior of the case structure. The transport device of the carrying case is a strap arrangement attached to the case structure which enables a wearer of the carrying case to position the case structure in a generally horizontal position in front of the wearer. The transport device may include a handle permanently attached to the exterior of the case structure for providing a hand carrying means.

In a preferred embodiment the strap arrangement comprises a first strap having two ends, attached at a first end to the first side wall at an attachment point near the front wall, and attached at a second end to the second side wall at an attachment point near the rear wall; and a second strap having two ends, attached at a first end to the first side wall at an attachment point near the rear wall, and attached at a second end to the second side wall at an attachment point near the front wall. The first and second strap connect to each other at a connection point, generally located at a distance midway along the length of the first and second straps, enabling the straps to lay generally parallel on top of each other when the carrying case is supported on a shoulder of the wearer, and to form a harness for positioning and supporting the case in a generally horizontal position in front of and against the abdominal area of a wearer when the wearer is in standing position.

The present invention relates to a convertible carrying case and work platform for small electronic devices, such as notebook computers, tablet computers, personal digital assistants and printers, or a combination of small electronic devices, for example, a personal digital assistant and a small label printer. For purposes of this description, use of the invention with a notebook computer will be described by way of example. The convertible carrying case is adapted to be carried by the wearer to transport the notebook computer and to convert into a work platform for the computer when the wearer of the case is sitting, called the "sitting work platform position," or is standing, called the "standing work platform position."

The carrying case is particularly suited to persons who choose to compute without the aid of a desk or a table, for example, while commuting or traveling, or while sitting in a semi-reclined position. Additionally, the carrying case is suited for use by persons who must compute on their feet, for example, by persons who inventory goods, like moving personnel who inventory goods located on a premises in preparation for packing and shipping the goods, by persons who conduct retail pricing and invoicing, by census takers, building inspectors, and insurance adjustors. When the case is closed and being transported, the strap arrangement is described as being in a "transport" position; when the case is positioned in standing work platform position the strap arrangement is described as being in a "harness" position. "Semi-reclined position" refers to a wearer who is in a partially seated position with his knees propped in front of him, for example, when the wearer is sitting on the floor and leaning against a wall. In the following description the directional term "front" refers to the location of the portions of the case which are closest to the wearer when the carrying case is positioned in the sitting work platform position, and the term "rear" to portions of the case which are farthest from the wearer when the carrying case is positioned in the sitting work platform position. In standing work platform position, the case is rotated 180 degrees in a horizontal plane from sitting work platform position. The directional terms "upward" and "inward" shall reference the case structure as horizontally positioned in FIG. 1.

A typical notebook computer comprises a folding unit of two pivotally connected sections, a screen section and a keyboard section. In a closed position the notebook computer is a six-sided unit having a rectangular top and bottom. To put the notebook computer in an open position for use, the screen portion is pivoted about a long side of the computer away from the keyboard section, which locates the keyboard section at a level below and in front of the screen section. While there are many styles and sizes of notebook computers, they are constructed and operate in generally the same manner. The carrying case of the invention is adaptable for use with multiple styles and sizes of notebook computers. A typical notebook computer is shown in the accompanying figures in dashed lines as notebook computer 21.

Figure 4:
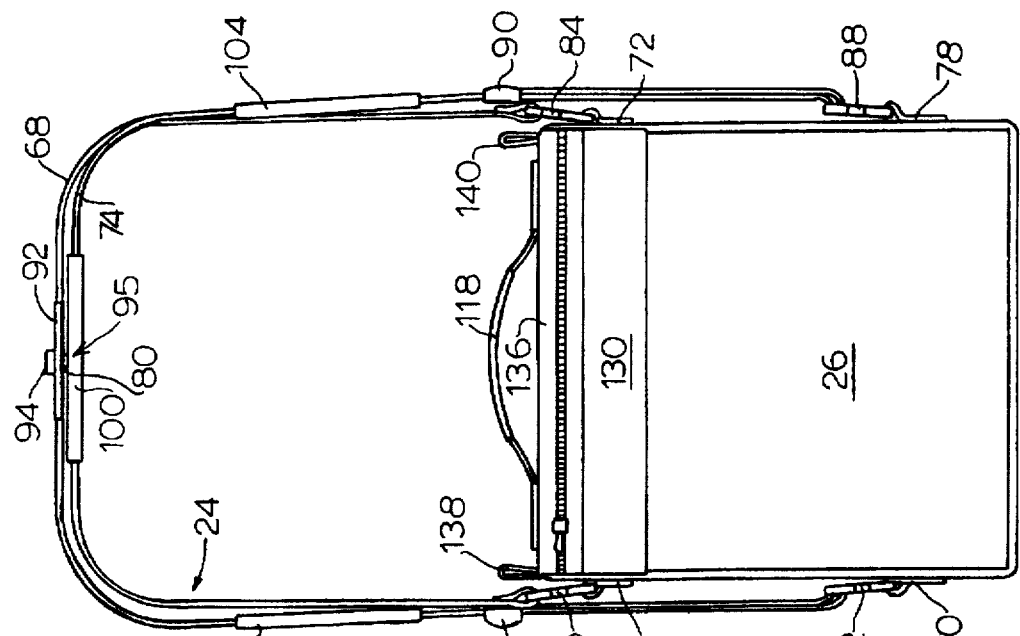
FIG. 4 is a rear elevation view of the carrying case of FIG. 2.
Figure 3:
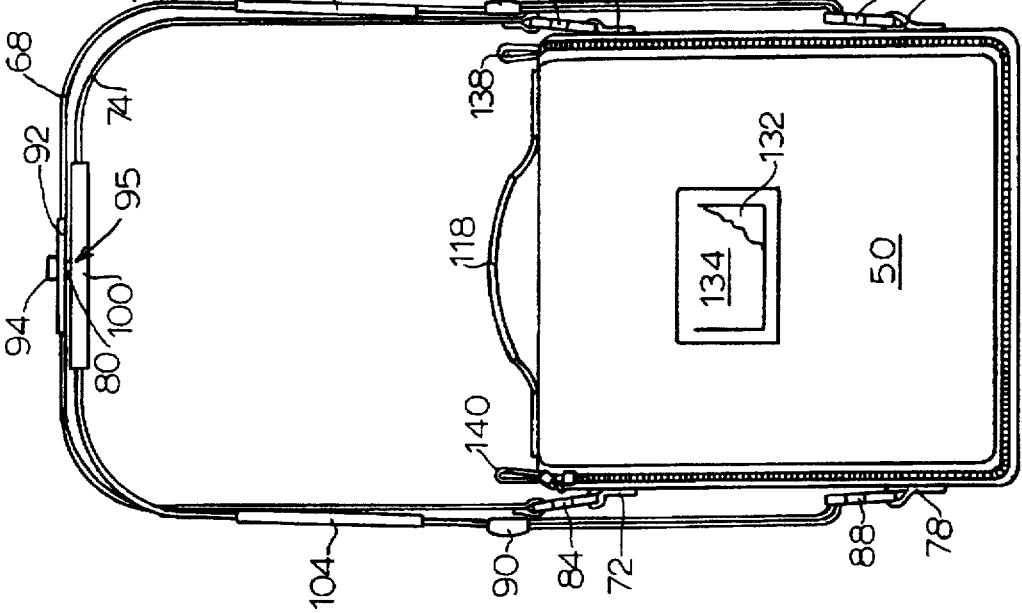
FIG. 3 is a front elevation view of the carrying case of FIG. 2.

Referring now to the figures, convertible carrying case 20 is comprised generally of case structure 22 and strap arrangement 24, shown in FIG. 1. FIG. 1 illustrates the carrying case 20 in an open position with strap 68 and strap 74 separated from one another and suspended above case structure 22 for ease of reference. Case structure 22 comprises bottom panel portion 26, front wall 34, first side wall 36, second side wall 38, rear wall 40, and top cover portion 50. Although bottom panel portion 26, front wall 34, first side wall 36, second side wall 38, rear wall 40 and top cover portion 50 are described as separate portions, more than one portion may be formed from a unitary piece depending upon manufacturing and production considerations. When constructed from separate pieces, the portions may be secured together by any suitable means, preferably by sewing. Case structure 22, as shown in FIGS. 1, 3 and 4, has a generally rectangular top cover portion 50 and bottom panel portion 26. The width of case structure 22 corresponds generally to the width of computer 21, shown in dashed lines in FIG. 6. Although the width of a computer may vary with the style of computer, case structure 22 is adapted for use with differing sizes of computers as described further in the specification. Walls 34, 36, 38 and 40 as viewed in FIG. 1, extend upwardly from the respective four edges of bottom panel portion 26 to form a side wall portion with respective upper edges from each wall, and together with bottom panel portion 26 form a receptacle for case structure 22, having an interior area and an exterior. The height of walls 34, 36, 38 and 40 define Depth D of case structure 22, shown in FIG. 2. Depth D corresponds generally to the height of a closed notebook computer 21.

Figure 1A:
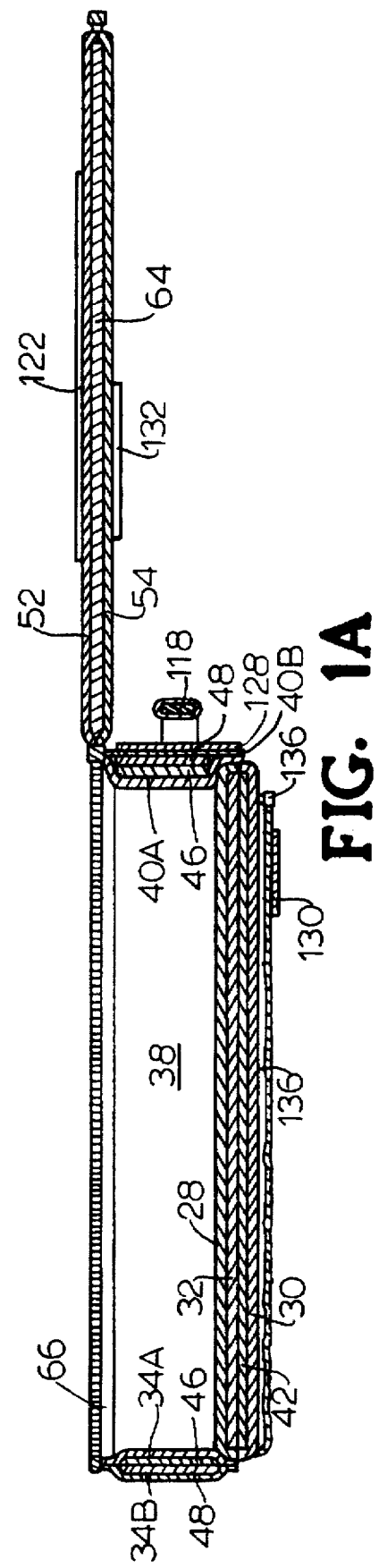
FIG. 1A is a cross-section view along line 1A—1A of the carrying case of FIG. 1 with the straps detached for ease of reference.

Preferably, bottom panel portion 26 comprises interior flexible panel portion 28 and exterior flexible panel portion 30, shown in FIG. 1A. The edges of interior flexible panel portion 28 and exterior flexible panel portion 30 are sewn together to form bottom panel portion 26. Interior flexible panel portion 28 is preferably constructed of a flexible, soft material which provides padding to the case interior to assist in protecting computer 21 from impact and scratches. In a preferred embodiment, the nature of the material of interior flexible panel portion 28 is such that the hook component of a hook and loop type fastener, such as the type of fastener available under the trademark VELCRO™, is releasably attachable to the surface of interior flexible panel portion 28. A suitable fabric is "Brush with Tricot" of the type available from GC IV Laminating Co. of Danville, Pa. If interior flexible panel portion 28 is not used, then a fastening device for attaching the loop component of a hook and loop type fastener is used so that the hook component of such fastener is releasably attachable to the interior of case structure 22.

Exterior flexible panel portion 30 forms the exterior surface of bottom panel portion 26. Exterior flexible panel portion 30 is preferably constructed of a flexible, durable material so that case 20 is able to assist in protecting computer 21 from the hazards of normal usage, e.g., rain, beverage spills, contact with the ground, handling, etc. Such a material should also be flexible and lightweight. A suitable material for exterior flexible panel portion 30 is 1000 denier Cordura™ available from Brookwood Company, Inc. of New York, N.Y., or from Unitex of Fort Lauderdale, Fla. Optionally, bottom panel portion 26 may be constructed of a rigid, lightweight plastic material which provides a sturdy and stable case which is also lightweight.

Figure 5:
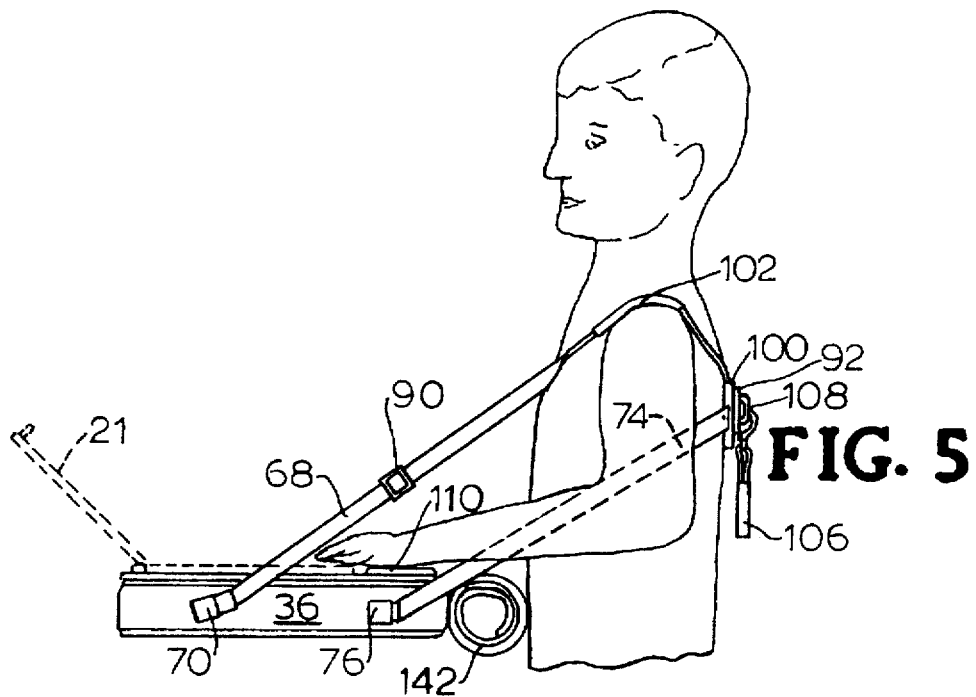
FIG. 5 is a side elevation view of the carrying case of FIG. 1 equipped with a notebook computer shown in dashed lines and an accessories pouch, and illustrates a wearer with the carrying case harnessed in front of the wearer in standing work platform position.
Figure 8:
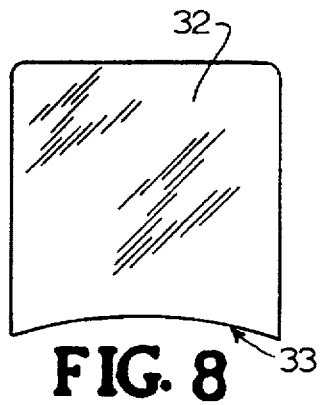
FIG. 8 is a top plan view of the stiffening insert of the carrying case of FIG. 1.

In a preferred embodiment, bottom panel portion 26 comprises stiffening insert 32 (shown in FIG. 1A, and shown removed from case structure 22 in FIG. 8). Stiffening insert 32 is placed and secured between interior flexible panel portion 28 and exterior flexible panel portion 30, shown in FIG. 2. Optionally, padding layer 42 is secured into bottom panel portion 26 with insert 32, as shown in FIG. 1A. In a preferred embodiment, the edges of flexible panel portions 28 and 30 are sewn together to secure stiffening insert 32 between bottom panel portion 26. Stiffening insert 32 corresponds generally in both length and width to the length and width of bottom panel portion 26. When stiffening insert 32 is secured within bottom panel portion 26 in case structure 22, edge 33 of stiffening insert 32 is proximate to rear wall 40, as shown in dashed lines in FIG. 1. In a preferred embodiment, edge 33 forms an arcuate edge which curves inwardly toward the center of stiffening insert 32 and is shaped to conform around the front abdominal portion of a wearer when case 20 is positioned on the wearer in standing work platform position, as shown in FIG. 5. A suitable material for stiffening insert 32 is polypropylene board, approximately ⅛-inch thick (approximately 32 mm) of the type available from Aquaknife of Savannah, Ga.

It is a unique feature of the invention that stiffening insert 32 provides a rigid base for computer 21 when computer 21 is used in case 20 in sitting or in standing work platform position by giving rigidity to bottom panel portion 26. Because the length and width dimensions of stiffening insert 32 correspond generally to the length and width dimensions of bottom panel portion 26, computer 21 is capable of being placed anywhere on bottom panel portion 26 in a position which is most comfortable for the wearer of case 20, for example, at a distance away from the wearer's body which is most comfortable.

Front wall 34, first side wall 36, second side wall 38 and rear wall 40 extend upwardly from respective edges of bottom panel portion 26. In a preferred embodiment, each wall 34, 36, 38 and 40 comprises an interior flexible wall portion 34A, 36A, 38A and 40A respectively, and an exterior flexible wall portion 34B, 36B, 38B and 40B respectively.

Interior flexible wall portions 34A and 40A and exterior flexible wall portions 34B and 40B are shown in FIG. 1A and are representative of the other interior and exterior flexible wall portions 36A, 38A, 36B and 38B. A suitable material for interior flexible wall portions 34A, 36A, 38A and 40A is the type material previously described for interior flexible panel portion 28. If interior flexible wall portions 34A, 36A, 38A and 40A are not utilized in case structure 22, then a fastening device for attaching the loop component of a hook and loop type fastener is used so that the hook component of such fastener is releasably attachable to the interior area of case structure 22. A suitable material for exterior flexible wall portions 34B, 36B, 38B and 40B is the type material previously described for exterior flexible panel portion 30. Similar to the material for bottom panel portion 26, walls 34, 36, 38 and 40 may be constructed of a rigid, lightweight plastic material which provides a sturdy and stable case which is also lightweight.

In a preferred embodiment walls 34, 36, 38 and 40 comprise a stiffening panel 46 and padding 48, thereby forming a padded structure which is also flexible, shown in cross-section in FIG. 1A. Stiffening panel 46 and padding 48 are placed and secured between respectively interior flexible wall portions 34A, 36A, 38A and 40A and exterior flexible wall portions 34B, 36B, 38B and 40B. Stiffening panel 46 and padding 48 provide added cushioning and rigidity to case structure 22 for enhanced protection provided by case structure 22 to computer 21. A suitable material for stiffening panel 46 is Hips White Polystyrene, approximately 1/16" thick (approximately 16 mm) of the type available from Atlantic Plastic Division—9 of Cadillac Plastic & Chemical Co. of Raleigh, N.C., or corrugated plastic available from Welsh Paper Co., of Youngsville, N.C. A suitable material for padding 48 is 2 pound EVA medium foam or 2 pound ethylene vinyl acetate, approximately ¼" thick (approximately 64 mm), of the type available from Rubatex of Greensboro, N.C. Optionally, in another preferred embodiment a stiffening insert (not shown) is substituted for stiffening panel 46 and padding 38 in walls 34, 36, 38 and 40 between portions 34A and 34B, 36A and 36B, 38A and 38B, and 40A and 40B respectively. An appropriate material is similar to that of insert 32, polypropylene board approximately ⅛-inch thick (approximately 32 mm). A stiffening insert or stiffening panel 46 and padding 38 alternatively is omitted from rear wall 40 so that maximum flexibility is maintained in rear wall 40 for use of case 20 in standing work platform position.

Figure 2:
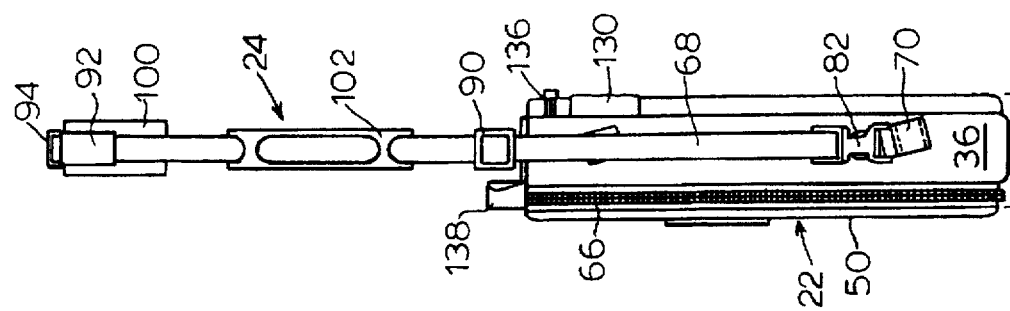
FIG. 2 is a side elevation view of the carrying case of FIG. 1 showing the carrying case closed.

Top cover portion 50 corresponds generally to the size and shape of bottom panel portion 26 and is located opposite of bottom panel portion 26 when case 20 is closed, shown in elevation view in FIG. 2. Top cover portion 50 comprises front edge 56, rear edge 58, first side edge 60 and second side edge 62. Top cover portion 50 is releasably joinable to the upper edges of front wall 34, first side wall 36, and second side wall 38 at respectively front edge 56, first side edge 60, and second side edge 62. In a preferred embodiment, rear edge 58 of top cover portion 50 is permanently attached, or in another embodiment, integral to rear wall 40. In a preferred embodiment, zipper 66 releasably joins edges 56, 60 and 62 of top cover portion 50 to the respective upper edges of walls 34, 36 and 38. A suitable zipper is #4 zipper (#4.5 CF ⅝ Tape 580) of the type available from YKK of Marietta, Ga. Other means such as snaps and hooks, or hook and loop type fastener, are suitable alternative attachment devices to releasably attach edges 56, 60 and 62 of top cover portion 50 respectively to walls 34, 36 and 38. In another embodiment, top cover portion 50 is also releasably joinable to the upper edge of rear wall 40.

Also, in a preferred embodiment, top cover portion 50 comprises interior flexible panel portion 52 and exterior flexible panel portion 54 (FIG. 1A), and each is comprised of a similar type of material as previously described for respectively interior flexible panel portion 28 and exterior flexible panel portion 30. Optionally, padding layer 64 (shown in FIG. 1A) may be inserted between interior flexible panel portion 52 and exterior flexible panel portion 54 to provide additional padding to top cover portion 50. In this manner, case structure 22 assists in providing additional protection to computer 21. The thickness of padding layer 64 depends on the desired padding for case structure 22 and is important in determining the padding thickness, positioning, and elevation provided by top portion 50 when top portion 50 forms either rolled portion 142 or 144 (FIGS. 5 and 10), described in more detail below. Optionally, top cover 50 is equipped with an air bladder system which is pumped by the wearer until the desired thickness for rolled portions 142 and 144 is achieved.

In an alternative embodiment top cover portion 50 is comprised of an elastic material which enables top cover portion 50 to be stretched so that when rolled portion 144 is formed the entire rolled portion is located underneath the case structure. In another alternative embodiment, top cover portion is releasably attached to walls 34, 36, 38 and 40. When case 20 is opened to expose computer 20 for use by a wearer, the wearer chooses to which wall top cover portion 50 will remain attached, and will release top cover portion 50 from the other three walls.

Figure 10:
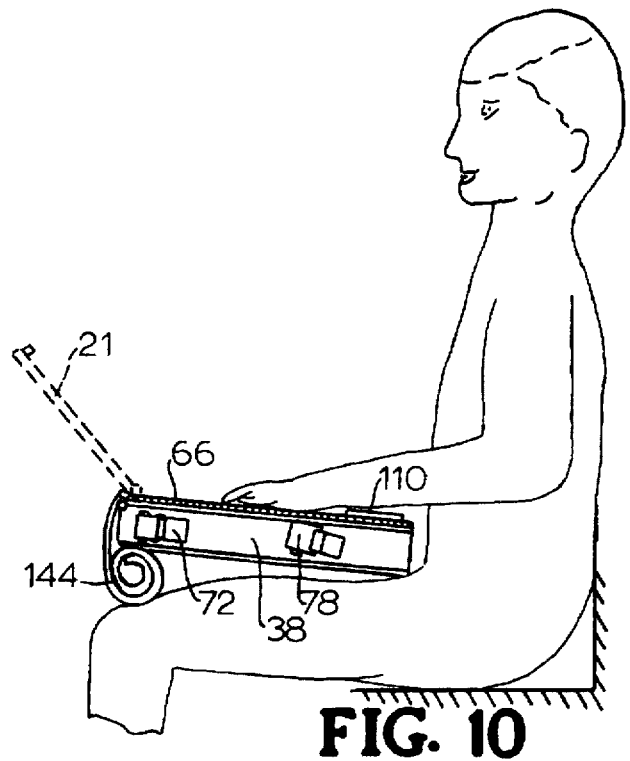
FIG. 10 is a side elevation view of the carrying case of FIG. 1 illustrating the case positioned for use as a work platform in sitting work platform position with the top portion forming a rolled portion under the case.

When case 20 is in sitting work platform position, top cover portion 50 forms rolled portion 144, shown in FIG. 10. Rolled portion 144 acts as an elevating device which elevates case structure 22 in the wearer's lap, and provides cushioning between case structure 22 and the wearer's lap. The thickness of top cover portion 50, and the tightness with which rolled portion 144 is formed, determine the height that bottom panel portion 26 at wall 40 is elevated in the wearer's lap, and the thickness of the cushioning to the wearer's lap. When case 20 is in standing work platform position, top cover portion 50 forms rolled portion 142, FIG. 5. Rolled portion 142 acts as a spacing device which spaces case structure 22 at a distance away from the wearer's body and provides cushioning between case structure 22 and the wearer's abdominal area. The thickness of top cover portion 50, and the tightness with which rolled portion 142 is formed, determine the distance that case 20 is spaced away from the wearer, and the thickness of the cushioning to the wearer's abdomen area. Rolled portion 142 also acts as a spacing device when the wearer is in a semi-reclined position and uses case 20 (not shown). The wearer can adjust these distances by varying the tightness with which rolled portions 142 and 144 are rolled. If an air bladder system is utilized in top cover portion 50, the thickness and amount of cushioning of rolled portions 142 and 144 are determined by the amount of air the wearer pumps into top cover portion 50 by the air bladder system. It is a unique feature of the invention that in this manner top cover portion 50 serves a function in both sitting and standing work platform positions.

Strap arrangement 24 (shown generally in FIG. 1) serves to position case 20 in transport position and acts as a transport device (FIGS. 2 through 4) or in standing work platform position (FIG. 5). Strap arrangement 24 comprises first strap 68 and second strap 74 that are of similar length, shown in FIG. 3 and 4, and are preferably adjustable in length by adjustors 90. As shown in FIGS. 1 and 4, first strap 68 having two ends is attached at a first end to first side wall 36 at attachment point 70 near front wall 34, and attached at a second end to second side wall 38 at attachment point 72 (shown in FIG. 3) near rear wall 40. Second strap 74 is attached at a first end to first side wall 36 at attachment point 76 near rear wall 40, and attached at a second end to second side wall 38 at attachment point 78 (shown in FIG. 3) near front wall 34. Straps 68 and 74 are constructed of a durable flexible material capable of supporting case structure 22 and notebook computer 21, and are of a suitable width to provide adequate support as well as providing comfort to the wearer of case 20. A suitable strap material is a web of approximately one-inch (approximately 2.54 cm), such as #1.2 MM580 1" available from YKK of Marietta, Ga.

Straps 68 and 74 are preferably detachable from case structure 22 at attachment points 70, 72, 76 and 78 by, respectively, releasable fastening means 82, 84, 86 and 88. Releasable fastening means are preferably a side release buckle, such as a one-inch (approximately 2.54 cm) side release buckle of the type available from YKK of Marietta, Ga. Hooks, latches and traditional buckles or snap arrangements are suitable alternatives. The precise location of and distance between attachment points 70 and 76, and attachment points 72 and 78, is not critical; however, the attachment points 70, 72, 76 and 78 must be placed so that strap arrangement 24 functions properly in transport position and as a harness in standing work platform position. There is sufficient distance between attachment points 70 and 76 and between 72 and 78 so that case structure 22 does not rotate away from or toward the wearer when the wearer is using computer 21 in case 20 in standing work platform position. The distance between the respective attachment points must also not be so great so as to permit case structure 22 to bow when a wearer puts pressure on computer 21 while using computer 21 in standing work platform position. In another embodiment of the invention, straps 68 and 74 are omitted from case 20 and handle 118 provides the transporting device. This embodiment is useful for a wearer who intends to transport computer 21 and to utilize case 20 in sitting work platform position, or when the wearer is in a semi-reclined position, but who does not intend to use case 20 in standing work platform position.

Figure 9:
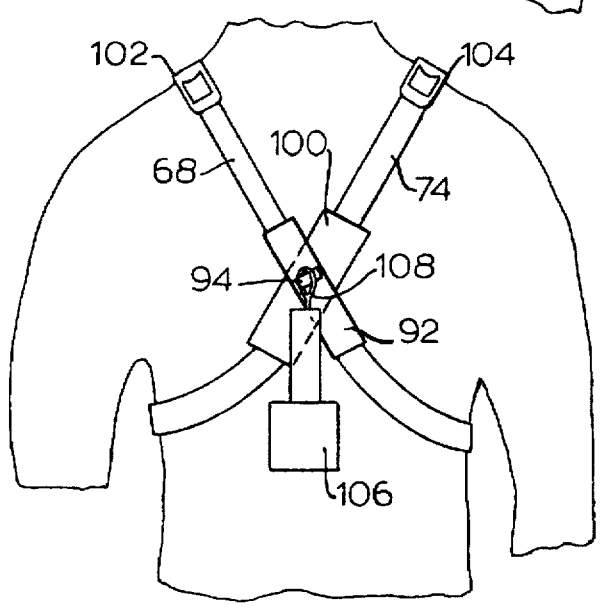
FIG. 9 is an back view of the carrying case of FIG. 5 illustrating the connection point of the straps enlarged for ease of reference.

In a preferred embodiment, when case 20 is in use in either transport position or standing work platform position, strap 68 crosses over strap 74 (shown in FIGS. 3, 4 and 9). Straps 68 and strap 74 are connected at swivel connection point 80 (FIGS. 3 and 4). Swivel connection point 80 comprises releasable connecting device 95 which permits straps 68 and 74 to swivel around swivel connection point 80 when the straps 68 and 74 are connected. A particularly unique feature of the invention is that swivel connection point 80 permits the straps to convert from the transport position to harness position without the straps becoming twisted. This feature lends to the ease and convenience of using case 20.

Connecting device 95 may be placed at a fixed location on straps 68 and 74. In a preferred embodiment, connecting device 95 is affixed to movable sleeves 92 and 100 on straps 68 and 74 respectively so that the swivel connection point 80 can be adjusted on the back of the wearer to the comfort of the wearer. A suitable connecting device 95 is a heavy duty snap. Snap protrusion 96 is affixed to the underside of sleeve 92 on strap 68 (FIG. 1); snap receptacle 98 is affixed to the corresponding side of sleeve 100 on strap 74 (FIG. 1). A button arrangement is a suitable alternative for connective device 95.

To put straps 68 and 74 into harness position from transport position, the wearer first positions straps 68 and 74 so that they are placed around the wearer's neck so that case structure 22 hangs in front of the wearer. The wearer then places his arms between straps 68 and 74 located on each side of case structure 22. Strap 68 will typically be located on top of the wearer's left arm to be positioned over the wearer's left shoulder, and strap 74 on top of the wearer's right arm to be positioned over the wearer's right shoulder. To assist the wearer in visually determining which strap should be placed on top of each arm, straps 68 and 74 are preferably coded in some manner, for example by a color-coded thread or bracket, in an area near the end of the strap that is attached closer to front wall 34.

Sleeve 100 also serves as a shoulder pad for padding a wearer's shoulder when case 20 is supported on a wearer's shoulder in transport position. The outer surface of sleeve 92 optionally contains loop 94 for optional attachment of a counterweight arrangement. In a preferred embodiment the counterweight arrangement is counterweight sack 106 attached to loop 94 by hook 108, as shown in FIG. 9. Counterweight sack 106 is preferably an openable sack so that weights of varying heaviness are insertable into the sack. A typical counterweight is a flat lead 2 lb. weight. Depending on the preference of the wearer and the length of time the wearer will wear the case in standing work platform position, the size of the weight will vary. Straps 68 and 74 also contain shoulder pads 102 and 104 respectively which are movable along the length of straps 68 and 74. Shoulder pads 102 and 104 provide padding to the shoulders of a wearer when case 20 is in standing work platform position (FIGS. 5 and 9).

Optionally, sleeves 92 and 100 are rigid around the circumference of the opening ends of each of the sleeves in a shape which corresponds generally to the cross-section of straps 68 and 74. This rigid opening permits straps 68 and 74 to pass easily through sleeves 92 and 100 respectively, and assists in keeping the straps from twisting in sleeves 92 and 100. A metal oval ring (not shown) inserted into casings around the circumferences of each sleeve end of sleeves 92 and 100 is an adequate method for providing the rigidity to the sleeve ends.

As previously mentioned, carrying case 20 of the invention is uniquely adapted to provide a case for transporting a notebook computer (transport position) and which is convertible to provide a sitting work platform (sitting work platform position), a standing work platform (standing work platform position), and a work platform for a wearer who is in a semi-reclined position. Use in each position will in turn be discussed.

Figure 6:
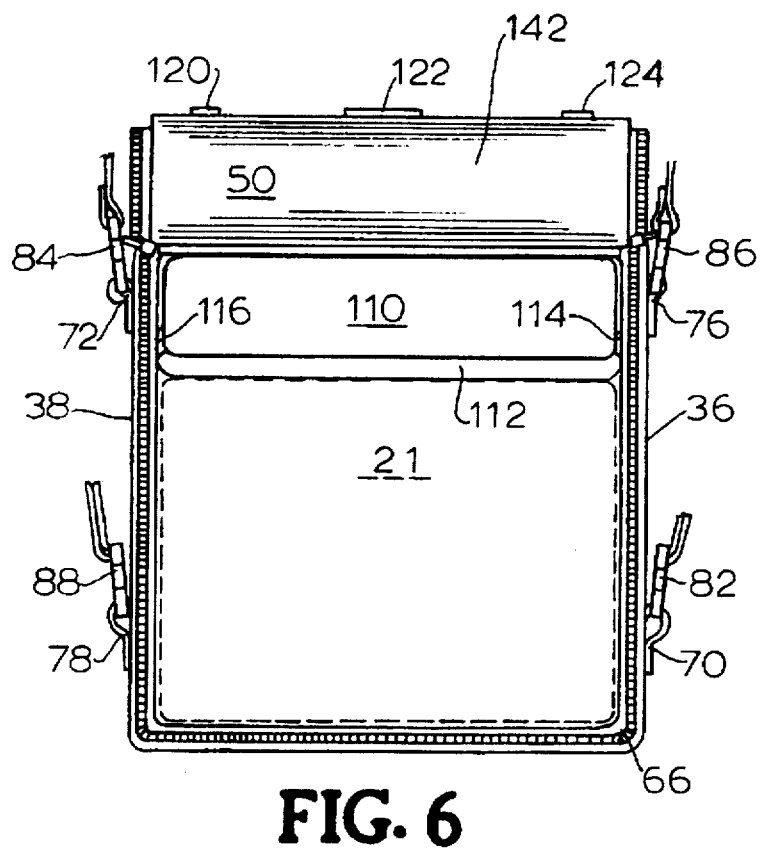
FIG. 6 is a top view of an embodiment of the carrying case of FIG. 5 showing the notebook computer closed.

In the transport position, top cover portion 50 is closed and straps 68 and 74 are positioned generally parallel to one another for placement over the wearer's shoulder, FIGS. 2 through 5. In transport position, notebook computer 21 is closed and placed in case structure 22. Adhesive strips of the hook component of a hook and loop fastener, such as the type fastener offered under the trademark VELCRO™ (not shown) are optionally applied to the bottom surface, or also the side surfaces, of notebook computer 21 to assist in securing computer 21 to the interior fabric of case structure 22. Accessories pouch 110, shown in FIG. 6, is optionally included in case 20. Accessories pouch 110 holds computer accessories such as counterweight sack 106, a battery pack, disks and the like. Accessories pouch 110 is preferably of a flexible material, and also optionally contains on an outside surface the hook component of a hook and loop fastener, such as VELCRO™ fastener, so that the accessories pouch 110 may be releasably secured to the interior fabric of case structure 22 in any position of the wearer's choosing.

Brace 112 (FIG. 6) is also contained within carrying case 20. Brace 112 comprises tab 114 and tab 116. Brace 112 is releasably attachable to the inner portions of first side wall 36 and second side wall 38 by tab 114 and tab 116 respectively. Brace 112 serves to secure computer 21 in case structure 22, and to partition computer 21 from accessories pouch 110. Tabs 114 and 116 are constructed of the hook component of a hook and loop type fastener, such as VELCRO™ fastener, so as to be releasably attachable to the interior of case structure 22, and so as to be capable of random placement in case structure 22 according to the wearer's discretion.

Although the accompanying figures show only a single brace 112 and a single accessories pouch 110, it is appreciated that a variety of sizes and a varying number of such devices are optional additions and within the scope of this disclosure. Optionally, a flexible, adjustable strap having a hook type component along one surface serves as an alternative style brace 112 which allows the wearer much discretion in placing and securing a plurality of devices in case structure 22. Such a flexible, adjustable alternative brace 112 is attachable into the interior of case structure 22 in any number of ways, for example, forming a compartment by attaching one end to the middle of the rear wall 40 and the opposite end to the middle of side wall 36, by attaching the middle section of alternative brace 112 to bottom panel portion 26 and wrapping the ends around an electronic device that is placed upon the middle section. In this manner, the number and size of the compartments formed in the interior area of case structure 22 are variable in accordance to the wearer's preference.

Tabs 138 and 140 (FIG. 7) assist the wearer in opening and closing zipper 66 by holding case structure 22 stable while operating zipper 66. Handle 118 (FIGS. 1A, 3, and 4) is secured to the exterior of case structure 22, preferably on rear wall 40, and enables the wearer to transport carrying case 20 by hand. An identification window 132 with flap 134 (FIG. 3) is optionally provided on top cover portion 50 for insertion of identification information. Other external labels and tags are similarly optionally provided on handle 118 or top cover portion 50.

FIG. 10 illustrates carrying case 20 in operation in sitting work platform position and illustrates the features of case 20 particularly relevant and unique to such position. In this position, case 20 rests on a wearer's lap. Straps 68 and 74 are detached from case structure 22 or may remain attached and inserted into exterior storage pocket 136 (FIG. 4) in bottom panel portion 26, or otherwise moved out of the way. In this position, front wall 34 is closest to the wearer. To open case 20 to expose notebook computer 21 for use in sitting work platform position, top cover portion 50 is released from the walls 34, 36 and 38 by zipper 66, and is rolled away from the wearer to form rolled portion 144. Fastener strips 120, 122 and 124 are releasably attached to receiver strip 130 (FIG. 4) which is secured to the exterior of bottom panel portion 26. As previously described, fastener strips 120, 122 and 124, and receiver strip 130, are preferably constructed of a hook and loop type fastener, such as VELCRO™ fastener. Suitable alternatives include tie back or snap arrangements. However, the hook and loop type fastener is preferred due to its ease and convenience of use, and its advantage of providing a secure attachment while also permitting adjustable and imprecise alignment and placement of fastener strips 120, 122 and 124 to receiver strip 130. Rolled portion 144 elevates case structure 22 in the wearer's lap, as shown in FIG. 10, and provides cushioning between case structure 22 and the wearer's lap.

Notebook computer 21 is positioned in case structure 22 so that the screen of computer 21 faces the wearer when computer 21 is open, generally with the pivoting edge of computer 21 against rear wall 40. According to the wearer's comfort, computer 21 may be placed at any comfortable distance between walls 40 and 34. Brace 112 operates to separate computer 21 from accessories pouch 110, and secures computer 21 against wall 34. Brace 112 also, at the wearer's option, serves to raise the keyboard section of computer 21 that is proximate to the wearer (not shown) to tilt the edge of the keyboard section upward when computer 21 is in use to assist in improving the ergonomics for the wearer, e.g., to assist in keeping the wearer's fingers at the same level as the wearer's wrists while operating computer 21. Optionally, accessories pouch 110 is placed in front of the keyboard section of computer 21 and forms a wrist rest also to improve the ergonomics for the wearer.

FIGS. 5–7 and 9 show case 20 in operation in standing work platform position, and illustrate the features of case 20 particularly relevant and unique to such position. In standing work platform position, case 20 is in a generally horizontal position in front of and against the abdominal area of the wearer as shown in FIG. 5. When case 20 is harnessed around the wearer in standing work position, second strap 74 extends from attachment point 78 on side wall 38 over the wearer's right shoulder, across the wearer's back, under the wearer's left arm, to attach to attachment point 76 on first side wall 36; similarly, first strap 68 extends from attachment point 70 on side wall 36 over the wearer's left shoulder, across the wearer's back, under the wearer's right arm, to attach to attachment point 72 on the rear portion of second side wall 38 (FIGS. 5 and 9). Straps 68 and 74 cross the wearer's back at connection point 80 as previously described, and as shown in FIG. 9. The wearer may adjust straps 68 and 74 in harness position to comfortably position case structure 22 in front of the wearer for computer use.

Figure 7:
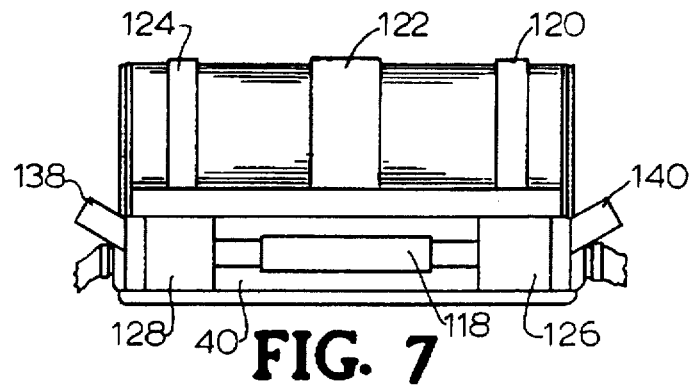
FIG. 7 is an end elevation view of the carrying case of FIG. 5 illustrating the position of the top cover portion after it has been rolled and just before it is secured to the case structure to form a rolled portion.

In this position, as compared to sitting work platform position, case 20 is rotated 180 degrees in a horizontal plane such that rear wall 40 is closer to the wearer than front wall 34. To expose notebook computer 21 for use in case 20 in standing work platform position, top cover portion 50 is released from walls 34, 36 and 38 and is rolled toward the wearer, as seen in FIGS. 5 through 7. Fastener strips 120, 122 and 124 are secured to the interior surface of top cover portion 50 and exposed when top cover portion 50 is rolled toward the wearer to form rolled portion 142, as shown in FIG. 5. Fastener strips 120 and 124 are releasably attached respectively to receiver strips 126 and 128 which are secured to the exterior of rear wall 40, as shown in FIGS. 6 and 7. Fastener strips 120, 122 and 124 and receiver strips 126 and 128 are constructed of a hook and loop type fastener, such as VELCRO™ fastener. Although other fastening means such as snaps and tie backs are suitable fasteners, a hook and loop type fastener is preferred due to its ease and convenience of use. Additionally, use of a hook and loop type fastener provides a suitably secure attachment means as well as permitting the adjustable and imprecise placement of top cover portion 50 against rear wall 40 while still achieving an effective attachment. FIG. 7 illustrates the position of top cover portion 50 just prior to being secured against rear wall 40. Once top cover portion 50 is secured to rear wall 40, the wearer may adjust the location of rolled portion 142 (FIG. 5) against the wearer's abdominal area for his or her own comfort. Edge 33 of stiffening insert 32 (FIG. 8) permits rolled portion 142 to conform more closely to the curved abdominal shape of the wearer.

When case 20 is in standing work platform position, notebook computer 21 is rotated 180 degrees in case structure 22 from its position in case structure 22 in sitting work platform position such that the pivoting edge of notebook computer 21 is positioned against front wall 34 in case structure 22. When computer 21 is in an open position the screen section faces the wearer, as shown in FIG. 5. Brace 112 forms an internal wall to secure computer 21 in position and to partition accessories pouch 110 from computer 21. Optionally, depending on the wearer's desired position of computer 21 in case 20, the keyboard section of open computer 21 is positioned against rear wall 40 (not shown).

When the wearer is in a semi-reclined position (not shown), rolled portion 142 acts as a spacing device to position case 20 at a distance away from the abdominal area of the wearer. The pivoting edge of computer 21 is positionable in case structure 22 against front wall 34, or depending on the wearer's preference, the keyboard section of open computer 21 is positioned against rear wall 40.

In a preferred embodiment of case 20, top cover portion 50 is formable into rolled portion 142 and 144, bottom panel portion 26 comprises a substantially rigid base, and straps 68 and 74 are formable into a harness for use of case 20 in standing work platform position. It is appreciated by the invention that for use in differing circumstances, case 20 is constructed without straps 68 and 74, or rollable top cover portion 50, or substantially rigid bottom panel portion 26, or a combination of these features.

In an alternative embodiment, top cover portion 50 is capable of forming a rolled portion which is extendable over any wall of the wearer's choosing. Top cover portion is releasably attached to walls 34, 36, 38 and 40. When case 20 is opened to expose computer 20 for use by a wearer, the wearer chooses to which wall top cover portion 50 will remain attached, and will release top cover portion 50 from the other three walls. Case structure 22 is equipped with receiver strips similarly positioned adjacent the respective walls and bottom panel portion edges as receiver strips 126, 128 and 130. In this manner each wall 34, 36, 38 and 40, and each edge of bottom panel portion 26 is capable of receiving top cover portion 50 when it forms a rolled portion. This embodiment of the carrying case is particularly suited for persons who wish to achieve maximum comfort in positioning case 20 for use when the wearer is in a sitting, or more particularly, a semi-reclined position.

From the foregoing description, it is seen that carrying case 20 provides a carrying case for a notebook computer which is adapted for use as a carrying case and a work platform, which is easy, convenient and comfortable to use when a wearer is sitting, is in a semi-reclined and when the wearer is standing. While the description describes the elevating device and the spacing device as being formed from top cover portion 50, it is appreciated that the elevating device and spacing devices are formable from other means. The devices, for example, may be formed from one or more inflatable cushions which are stored within the case and inflated and attached to the exterior of the case with the hook portion of a hook and loop type fastener to provide the elevating and spacing devices. Optionally, an elevating device is formed by a portion which is hinged to the bottom portion 26 and is releasable from bottom portion 26 to provide the elevating device. The devices are optionally inflatable pouches that are permanently secured to, or are secured within, the exterior of the case structure on bottom panel portion 26 or walls 34, 36, 38 or 40 in a way that, when inflated, the pouches protrude from the case structure along the surface where they are attached to the exterior of the case structure.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A convertible carrying case, comprising:
   a. a case structure comprising:
      i. a rectangular box having an interior area, a first side wall, a second side wall, a rear wall, a from wall, and a bottom panel portion surrounding said interior area, each of the walls having an upper edge, and forming with the bottom panel potion an exterior of the case structure;
      ii. a flexible top cover potion releasably joinable to the upper edges of at least three of the walls to form a closeable case structure such that when the top cover portion is released from the wails, the interior of the case structure is exposed and made accessible to a wearer, and which top cover potion may be formed into a rolled potion which may form an elevating device for elevating the carrying case in the wearer's lap when the carrying case is positioned in the wearer's lap, and which may form a spacing device for spacing the carrying case at a distance away from the wearer's abdomen and for cushioning the wearer when the carrying case is positioned in front of the wearer in a generally horizontal position when the wearer is standing, or when the carrying case is positioned in front of the wearer when the wearer is in a semi-reclined position;
   b. means for releasably attaching the rolled portion to the exterior of the case structure; and
   c. a transport device.

2. The convertible carrying case of claim 1 wherein the transport device is a strap arrangement which enables a wearer of the carrying case to position the case structure in a generally horizontal position in front of the wearer when the wearer is standing.

3. The convertible carrying case of claim of claim 2 wherein the strap arrangement comprises:
   a. a first strap having two ends, attached at a first end to the first side wall at an attachment point near the front wall, and attached at a second end to the second side wall at an attachment point near the rear wall;
   b. a second strap having two ends, attached at a first end to the first side wall at an attachment point near the rear wall, and attached at a second end to the second side wall at an attachment point near the front wall; and
   c. whereby the first strap and second strap connect to each other at a connection point, generally located at a distance midway along the length of the first and second straps, enabling the straps to lay generally parallel on top of each other when the carrying case is supported on a shoulder of a wearer, and to form a harness for positioning and supporting the case in a generally horizontal position in front of and against the abdominal area of the wearer when the wearer is standing.

4. The convertible carrying case of claim 3 wherein the first strap in an area near the first end and the second strap in an area near the second end are coded to indicate that the first and second ends of the respective straps are each attached near the front wall.

5. The convertible carrying case of claim 3 further comprising a counterweight arrangement positionable at the connection point of the first and second straps.

6. The convertible carrying case of claim 1 wherein the transport device is a handle secured to the exterior of the case structure for providing a hand carrying means.

7. The convertible carrying case of claim 1 wherein the bottom panel portion comprises a substantially rigid base.

8. The convertible carrying case of claim 1 wherein the bottom panel portion is formed by opposed interior and exterior rectangular flexible panel portions having selected edges thereof secured together and further comprising an insert secured between the interior and exterior panel portions whereby the bottom panel portion forms a generally rectangular substantially rigid base for the case structure.

9. The convertible carrying case of claim 1 further comprising a lining layer in the interior area of the case structure.

10. The convertible carrying case of claim 1 wherein the front wall, rear wall, first side wall and second side wall each form a flexible padded structure.

11. The convertible carrying case of claim 1 further comprising an accessories pouch releasably connectable in random positions to the interior area of the case structure and capable of providing a wrist rest for the wearer when the wearer operates a computer that is positioned in the carrying case.

12. The convertible carrying case of claim 1 further comprising a brace releasably connectable in the interior area of the case structure to enable the wearer to support and position an electronic device at different locations within the case structure.

13. A convertible carrying case, comprising:
 a. a case structure comprising:
  i. a rectangular box having an interior area, a first side wall, a second side wall, a rear wall, a front wall, and a bottom panel potion surrounding said interior area, each of the walls having an upper edge, and forming with the bottom panel portion an exterior of the case structure;
  ii. a flexible top cover portion attached to the upper edge of the rear wall, and releasably joinable to the upper edges of the side walls and front wall and which may be formed into a rolled portion;
  iii. means for releasably attaching the rolled portion to the exterior of the case structure; and
 b. a transport device.

14. The convertible carrying case of claim 13 wherein the transport device is a strap arrangement which enables a wearer of the carrying case to position the case structure in a generally horizontal position in front of the wearer when the wearer is standing.

15. The convertible carrying case of claim 14 wherein the strap arrangement comprises:
 a. a first strap having two ends, attached at a first end to the first side wall at an attachment point near the front wall, and attached at a second end to the second side wall at an attachment point near the rear wall;
 b. a second strap having two ends, attached at a first end to the first side wall at an attachment point near the rear wall, and attached at a second end to the second side wall at an attachment point near the front wall; and
 c. whereby the first strap and second strap connect to each other at a connection point, generally located at a distance midway along the length of the first and second straps, enabling the straps to lay generally parallel on top of each other when the carrying case is supported on a shoulder of a wearer, and to form a harness for positioning and supporting the case in a generally horizontal position in front of and against the abdominal area of the wearer when the wearer is standing.

16. The convertible carrying case of claim 15 wherein the first strap in an area near the first end and the second strap in an area near the second end are coded to indicate that the first and second ends of the respective straps are each attached near the front wall.

17. The convertible carrying case of claim 15 further comprising a counterweight arrangement positionable at the connection point of the first and second straps.

18. The convertible carrying case of claim 13 wherein the strap comprises a handle secured to the exterior of the case structure for providing a hand carrying means.

19. The convertible carrying case of claim 13 wherein the bottom panel portion comprises a substantially rigid base.

20. The convertible carrying case of claim 13 wherein the bottom panel portion is formed by opposed interior and exterior rectangular flexible panel portions having selected edges thereof secured together and further comprising an insert secured between the interior and exterior panel portions whereby the bottom panel portion forms a generally rectangular substantially rigid base for the case structure.

21. The convertible carrying case of claim 13 further comprising a lining layer in the interior area of the case structure.

22. The convertible carrying case of claim 13 wherein the rolled portion is releasably attachable to the exterior of the rear wall to form a spacing device for spacing the case at a distance away from the wearer's body and for cushioning the wearer when the carrying case is positioned in front of the wearer in a generally horizontal position.

23. The convertible carrying case of claim 13 wherein the rolled portion is releasably attachable to the exterior of the bottom panel portion to form an elevating device for elevating the carrying case in the wearer's lap when the carrying case is positioned in the wearer's lap in sitting work platform position.

24. The convertible carrying case of claim 13 wherein the rolled portion is releasably attachable to the exterior of the rear wall to form a spacing device for spacing the case at a distance away from the wearer's body and for cushioning the wearer when the carrying case is positioned in front of the wearer in a generally horizontal position, and wherein the rolled portion is also releasably attachable to the exterior of the bottom panel portion to form an elevating device for elevating the carrying case in the wearer's lap when the carrying case is positioned in the wearer's lap in sitting work platform position.

25. The convertible carrying case of claim 13 wherein the front wall, rear wall, first side wall and second side wall each form a flexible padded structure.

26. The convertible carrying case of claim 13 further comprising an accessories pouch releasably connectable in random positions to the interior area of the case structure and capable of providing a wrist rest for the wearer when the wearer operates a computer that is positioned in the carrying case.

27. The convertible carrying case of claim 13 further comprising a brace releasably connectable in the interior area of the case structure to enable the wearer to support and position an electronic device at different locations within the case structure.

28. A convertible carrying case, comprising:
 a. a case structure comprising:
  i. a rectangular box having an interior area, a first side wall, a second side wall, a rear wall, a front wall, and a substantially rigid bottom panel portion surrounding said interior area, each of the walls having an upper edge, and forming with the bottom panel portion an exterior of the case structure;

ii. a top cover portion attached to the upper edge of the rear wall, and releasably joinable to the upper edges of the side walls and front wall;

b. a strap arrangement comprising;

i. a first strap having two ends, attached at a first end to the first side wall at an attachment point near the front wall, and attached at a second end to the second side wall at an attachment point near the rear wall;

ii. a second strap having two ends, attached at a first end to the first side wall at an attachment point near the rear wall, and attached at a second end to the second side wall at an attachment point near the front wall; and iii. means for connecting the first strap and second strap to each other at a connection point, generally located at a distance midway along the length of the first and second straps, enabling the straps to lay generally parallel to each other along the length of the straps when the carrying case is supported on a single shoulder of a wearer, and to form a harness, with the means for connecting the first strap and the second strap positioned on the back of the wearer, for positioning and supporting the case in a generally horizontal position in from of and against the abdominal area of the wearer when the wearer is standing.

29. The convertible carrying case of claim 28 wherein the top cover portion may be formed into a rolled portion which may form a spacing device for spacing the carrying case at a distance away from the wearer's body and for cushioning the wearer when the carrying case is positioned in front of the wearer in a generally horizontal position.

30. The convertible carrying case of claim 28 wherein the bottom panel portion is formed by opposed interior and exterior rectangular flexible panel portions having selected edges thereof secured together and further comprising an insert secured between secured together and further comprising an insert secured between the interior and exterior panel portions whereby the bottom panel portion forms a generally rectangular substantially rigid base for the case structure.

31. The convertible carrying case of claim 28 further comprising a lining layer in the interior area of the case structure.

32. The convertible carrying case of claim 28 wherein the front wall, rear wall, first side wall and second side wall each form a flexible padded structure.

33. The convertible carrying case of claim 28 wherein the first strap in an area near the first end and the second strap in an area near the second end are coded to indicate that the first and second ends of the respective straps are each attached near the front wall.

34. The convertible carrying case of claim 28 further comprising an accessories pouch releasably connectable in random positions to the interior area of the case structure and capable of providing a wrist rest for the wearer when the wearer operates a computer that is positioned in the carrying case.

35. The convertible carrying case of claim 28 further comprising a brace releasably connectable in the interior area of the case structure to enable the wearer to support and position an electronic device at different locations within the case structure.

36. The convertible carrying case of claim 28 further comprising a counterweight arrangement positionable at the connection point of the first and second straps.

* * * * *

UNITED STATES PATENT AND TRADEMARK OFFICE
CERTIFICATE OF CORRECTION

PATENT NO. : 5,639,004
DATED : June 17, 1997
INVENTOR(S) : Douglas D. Carlton et al.

It is certified that error appears in the above-indentified patent and that said Letters Patent is hereby corrected as shown below:

Claim 1, line 4, correct "from" to read --front--.

Claim 3, line 1, delete "of claim", first appearance.

Claim 13, line 4, correct "wail" to read --wall--.

Claim 28, line 20, correct "wail" to read --wall--.

Claim 30, lines 5 and 6, delete "secured together and further comprising an insert secured between".

Signed and Sealed this

Sixteenth Day of September, 1997

*Attest:*

BRUCE LEHMAN

*Attesting Officer*     *Commissioner of Patents and Trademarks*